United States Patent
Henry et al.

(10) Patent No.: US 12,489,523 B2
(45) Date of Patent: Dec. 2, 2025

(54) BACKSCATTER DEVICE ONBOARDING

(71) Applicant: Cisco Technology, Inc., San Jose, CA (US)

(72) Inventors: Jerome Henry, Pittsboro, NC (US); Juan Carlos Zuniga, Montreal (CA); Stephen M. Orr, Wallkill, NY (US)

(73) Assignee: Cisco Technology, Inc.

( * ) Notice: Subject to any disclaimer, the term of this patent is extended or adjusted under 35 U.S.C. 154(b) by 9 days.

(21) Appl. No.: 18/497,054

(22) Filed: Oct. 30, 2023

(65) Prior Publication Data
US 2024/0380481 A1    Nov. 14, 2024

Related U.S. Application Data

(60) Provisional application No. 63/502,085, filed on May 13, 2023.

(51) Int. Cl.
*H04B 7/22* (2006.01)

(52) U.S. Cl.
CPC .................................... *H04B 7/22* (2013.01)

(58) Field of Classification Search
CPC ....................................................... H04B 7/22
See application file for complete search history.

(56) References Cited

U.S. PATENT DOCUMENTS

| | | | | |
|---|---|---|---|---|
| 6,238,340 B1* | 5/2001 | Alt | ......................... | A61B 90/39 600/431 |
| 7,511,624 B2* | 3/2009 | Shaw | ...................... | G01S 17/88 250/221 |
| 7,692,358 B2* | 4/2010 | Kvisteroy | .............. | G01D 21/00 310/318 |
| 7,995,197 B2* | 8/2011 | Sikora | ................ | G01M 11/3181 356/73.1 |
| 9,058,552 B2* | 6/2015 | Aubert | ............. | G06K 19/07771 |
| 9,566,988 B2* | 2/2017 | Ernst | ..................... | B61L 25/025 |
| 9,888,337 B1* | 2/2018 | Zalewski | ........... | G06Q 30/0635 |
| 10,488,296 B2* | 11/2019 | Sundermann | ......... | G01L 11/025 |
| 11,158,482 B2* | 10/2021 | Zeidler | .................... | H01J 37/04 |

(Continued)

FOREIGN PATENT DOCUMENTS

| | | | | |
|---|---|---|---|---|
| AU | 2002219167 A1 * | 2/2003 | ............... | G06K 7/00 |
| AU | 2002219167 B2 * | 7/2006 | ........... | G07B 15/063 |

(Continued)

OTHER PUBLICATIONS

Yang et al. Energy-Efficient_UAV_Backscatter_Communication_With_Joint_Trajectory_Design_and_Resource_Optimization, IEEE, Feb. 2021 (Year: 2021).*

(Continued)

*Primary Examiner* — Berhanu Tadese
(74) *Attorney, Agent, or Firm* — Merchant & Gould P.C.

(57) ABSTRACT

Backscatter Device (BKD) onboarding may be provided. BKD onboarding may begin with an AP receiving an identifier associated with a BKD. The AP may determine to onboard the BKD and transmit to the BKD an onboarding excitation signal to request data from a memory bank of the BKD. The AP may then receive a response to the onboarding excitation signal from the BKD. The AP may verify the BKD is valid based on the identifier and the response. Finally, the AP may onboard the BKD based on verifying the BKD is valid.

17 Claims, 4 Drawing Sheets

(56) References Cited

U.S. PATENT DOCUMENTS

| | | | | |
|---|---|---|---|---|
| 11,381,271 | B1* | 7/2022 | Zalewski | H04W 76/10 |
| 11,668,810 | B2* | 6/2023 | Lockie | G01S 13/003 |
| | | | | 342/125 |
| 11,678,112 | B2* | 6/2023 | Ghaffarivardavagh | ............ |
| | | | | H04B 11/00 |
| | | | | 367/157 |
| 11,815,608 | B2* | 11/2023 | Peterson | G01S 19/246 |
| 11,843,450 | B2* | 12/2023 | Talla | G06K 7/0008 |
| 12,153,992 | B2* | 11/2024 | Liu | G06K 7/10366 |
| 12,155,426 | B2* | 11/2024 | Barton | H04B 7/22 |
| 12,248,194 | B2* | 3/2025 | Erlendsson | H01B 7/045 |
| 2006/0064345 | A1* | 3/2006 | Biet | G07B 15/063 |
| | | | | 705/13 |
| 2006/0066839 | A1* | 3/2006 | Payton | G01L 1/242 |
| | | | | 356/73.1 |
| 2008/0079564 | A1* | 4/2008 | Shafer | G06K 7/0008 |
| | | | | 340/539.1 |
| 2008/0278325 | A1* | 11/2008 | Zimman | G06F 21/35 |
| | | | | 340/572.1 |
| 2010/0026466 | A1* | 2/2010 | Colby | G06K 19/0723 |
| | | | | 340/10.4 |
| 2012/0273679 | A1* | 11/2012 | Bewick | H01J 37/244 |
| | | | | 250/310 |
| 2014/0070011 | A1* | 3/2014 | Goh | G01S 5/02521 |
| | | | | 235/492 |
| 2015/0160072 | A1* | 6/2015 | Yan | G01J 1/0474 |
| | | | | 356/446 |
| 2015/0178528 | A1* | 6/2015 | Aubert | G06K 19/077 |
| | | | | 340/10.1 |
| 2016/0157725 | A1* | 6/2016 | Munoz | H04N 23/51 |
| | | | | 600/407 |
| 2018/0217029 | A1* | 8/2018 | Billings | G01N 1/14 |
| 2018/0358996 | A1* | 12/2018 | Gollakota | H04B 1/40 |
| 2020/0374700 | A1* | 11/2020 | Smith | H04L 9/3268 |
| 2022/0014450 | A1* | 1/2022 | Srikanteswara | H04L 41/5019 |
| 2022/0138337 | A1* | 5/2022 | Wilhelm | G06Q 30/0185 |
| | | | | 726/1 |
| 2022/0180141 | A1* | 6/2022 | Marquardt | H04L 9/3242 |
| 2022/0369277 | A1* | 11/2022 | Fara | H04B 5/77 |
| 2023/0113629 | A1* | 4/2023 | Deng | G06Q 10/087 |
| | | | | 705/28 |
| 2023/0206261 | A1* | 6/2023 | Cella | G06N 3/08 |
| 2023/0206329 | A1* | 6/2023 | Cella | G06Q 20/0855 |
| 2023/0214925 | A1* | 7/2023 | Cella | G06Q 30/06 |
| | | | | 705/37 |
| 2023/0269530 | A1* | 8/2023 | Ghaffarivardavagh | ............ |
| | | | | H04R 17/10 |
| | | | | 367/157 |
| 2023/0284123 | A1* | 9/2023 | Ge | H04L 5/0048 |
| | | | | 370/329 |
| 2023/0296722 | A1* | 9/2023 | Shrestha | G01S 5/0269 |
| | | | | 455/456.1 |
| 2023/0301514 | A1* | 9/2023 | Lepe | A61B 5/6821 |
| 2023/0316075 | A1* | 10/2023 | Cella | G06Q 20/3829 |
| 2023/0316305 | A1* | 10/2023 | Cella | G06Q 20/4016 |
| 2023/0316357 | A1* | 10/2023 | Cella | G06Q 20/3829 |
| 2023/0325720 | A1* | 10/2023 | Cella | G06Q 30/0206 |
| 2023/0325811 | A1* | 10/2023 | Cella | G06Q 40/04 |
| 2023/0325816 | A1* | 10/2023 | Cella | G06Q 40/04 |
| 2023/0325829 | A1* | 10/2023 | Cella | G06Q 40/00 |
| 2023/0342346 | A1* | 10/2023 | Cella | G06Q 20/36 |
| 2023/0344720 | A1* | 10/2023 | Kewitsch | G01M 11/3145 |
| 2023/0351292 | A1* | 11/2023 | Cella | G06N 3/08 |
| 2023/0351371 | A1* | 11/2023 | Cella | G06Q 30/0609 |
| 2023/0351393 | A1* | 11/2023 | Cella | G06Q 30/0206 |
| 2023/0410090 | A1* | 12/2023 | Cella | H04L 9/50 |
| 2023/0410093 | A1* | 12/2023 | Cella | G06Q 40/04 |
| 2023/0410095 | A1* | 12/2023 | Cella | H04L 9/50 |
| 2023/0419277 | A1* | 12/2023 | Cella | G06F 21/6245 |
| 2024/0024032 | A1* | 1/2024 | Kay | A61B 8/0833 |
| 2024/0089725 | A1* | 3/2024 | Wang | G01S 7/006 |
| 2024/0146408 | A1* | 5/2024 | Herath | H04J 11/00 |
| 2024/0267113 | A1* | 8/2024 | Dees | H04W 88/06 |
| 2024/0275542 | A1* | 8/2024 | Gupta | H04W 4/70 |
| 2024/0333338 | A1* | 10/2024 | Gandhi | H04B 7/0426 |
| 2024/0380481 | A1* | 11/2024 | Henry | H04B 7/22 |
| 2024/0389006 | A1* | 11/2024 | Xu | H04W 48/02 |
| 2024/0405808 | A1* | 12/2024 | Barton | H04B 7/22 |
| 2024/0405845 | A1* | 12/2024 | Huang | H04B 7/088 |
| 2025/0088266 | A1* | 3/2025 | Tayyab | H04B 7/04013 |

FOREIGN PATENT DOCUMENTS

| | | | | |
|---|---|---|---|---|
| AU | 2007305224 | A1* | 4/2008 | G06K 7/0008 |
| AU | 2021324681 | A1* | 3/2023 | A61B 3/16 |
| AU | 2021335193 | A1* | 3/2023 | H02J 50/90 |
| AU | 2022396273 | A1* | 5/2024 | G06Q 40/04 |
| BR | 102018069537 | A2* | 3/2019 | G01L 1/242 |
| BR | 102018069537 | B1* | 8/2023 | |
| BR | 112020010627 | B1* | 1/2025 | |
| CA | 2664012 | A1* | 4/2008 | G06K 7/0008 |
| CA | 2437301 | C* | 2/2013 | G07B 15/063 |
| CA | 2786436 | C* | 11/2017 | H04N 13/128 |
| CA | 2805701 | C* | 2/2018 | G01C 11/025 |
| CA | 3172888 | A1* | 2/2022 | A61B 5/6821 |
| CH | 674344 | A5* | 5/1990 | H01Q 15/0013 |
| CN | 108282222 | A* | 7/2018 | H04B 10/0791 |
| CN | 111641430 | * | 2/2019 | H04B 1/40 |
| CN | 112203246 | A | 1/2021 | |
| CN | 112512085 | B* | 11/2022 | H04B 7/22 |
| CN | 112203246 | B* | 3/2023 | H04W 74/0816 |
| CN | 116527124 | A* | 8/2023 | H04B 7/22 |
| CN | 116761258 | A* | 9/2023 | H04W 48/16 |
| CN | 116865844 | A* | 10/2023 | H04W 4/06 |
| CN | 117203948 | A* | 12/2023 | H04L 27/20 |
| CN | 117353802 | A* | 1/2024 | H04B 7/22 |
| CN | 114124705 | B* | 2/2024 | H04L 41/0823 |
| CN | 117639909 | A* | 3/2024 | H04L 25/0224 |
| CN | 117997418 | A* | 5/2024 | H04B 7/22 |
| CN | 118041435 | A* | 5/2024 | H04W 4/80 |
| CN | 118225267 | A* | 6/2024 | G08B 17/06 |
| CN | 118590136 | A* | 9/2024 | H04W 74/0816 |
| CN | 118659798 | A* | 9/2024 | H04W 4/30 |
| CN | 119603701 | A* | 3/2025 | H04B 7/04013 |
| DE | 10104502 | A1* | 8/2002 | G07B 15/063 |
| DE | 102014115153 | A1* | 4/2016 | G01B 9/02042 |
| DE | 102014115155 | A1* | 4/2016 | G01B 9/02042 |
| DE | 102014115157 | A1* | 4/2016 | G01B 9/02004 |
| DE | 102014220184 | A1* | 4/2016 | G01S 7/4802 |
| DE | 102015101251 | A1* | 7/2016 | G01B 9/02034 |
| DE | 102015101266 | A1* | 8/2016 | G01S 7/4816 |
| DE | 102015101268 | A1* | 8/2016 | G01S 17/931 |
| DE | 102017010629 | A1* | 5/2019 | C12M 41/30 |
| DE | 102018220932 | A1* | 6/2020 | G01S 7/4873 |
| EP | 0493247 | B1* | 11/1995 | G01S 7/4812 |
| EP | 0663592 | B1* | 12/2002 | G01N 15/0205 |
| EP | 1923674 | A1* | 5/2008 | G01L 9/0016 |
| EP | 1794905 | B1* | 9/2010 | G01M 11/3181 |
| EP | 3011277 | B1* | 11/2016 | G01D 5/48 |
| EP | 2510536 | B1* | 11/2018 | H01J 37/26 |
| EP | 3565211 | A1 | 11/2019 | |
| EP | 3450951 | B1* | 3/2020 | G01M 5/0091 |
| EP | 3006919 | B1* | 12/2021 | G01D 5/35358 |
| EP | 3945322 | A1* | 2/2022 | G01S 19/246 |
| EP | 4109325 | A1* | 12/2022 | G06Q 10/087 |
| EP | 3945322 | B1* | 3/2023 | G01S 19/246 |
| EP | 4156654 | A1* | 3/2023 | H04L 41/5019 |
| EP | 3994804 | B1* | 5/2024 | H04B 5/45 |
| EP | 4156654 | B1* | 8/2024 | H04L 41/5019 |
| EP | 3753038 | B1* | 1/2025 | H01J 37/28 |
| FR | 2679022 | A1* | 1/1993 | F42C 13/045 |
| FR | 3070499 | A1* | 3/2019 | G01M 11/085 |
| FR | 3096468 | A1* | 11/2020 | H04B 5/45 |
| FR | 3098304 | A1* | 1/2021 | H04W 16/26 |
| FR | 3098305 | A1* | 1/2021 | H04B 5/45 |
| FR | 3103904 | A1* | 6/2021 | G01S 5/0226 |
| FR | 3103985 | A1* | 6/2021 | H04W 52/367 |
| JP | 2002005784 | A* | 1/2002 | |
| JP | 2016019849 | A* | 2/2016 | G01S 7/52046 |
| KR | 20220021846 | A* | 2/2022 | G06N 3/092 |
| KR | 102514731 | B1* | 3/2023 | H04B 1/18 |
| KR | 20230056703 | A* | 4/2023 | A61B 5/686 |

(56) References Cited

FOREIGN PATENT DOCUMENTS

| | | | | | |
|---|---|---|---|---|---|
| KR | 20240064357 | A | * | 5/2024 | ............ G16Y 40/30 |
| KR | 20250000478 | A | * | 1/2025 | ............ H04W 84/18 |
| OA | 18841 | A | * | 7/2019 | |
| RU | 2606698 | C2 | * | 1/2017 | .......... G01T 1/2006 |
| UA | 56919 | U | * | 1/2011 | |
| UA | 60342 | U | * | 6/2011 | |
| WO | WO-02061690 | A1 | * | 8/2002 | ........... G07B 15/063 |
| WO | WO-2005060699 | A2 | * | 7/2005 | ............ G09G 3/001 |
| WO | WO-2005060701 | A2 | * | 7/2005 | ............ G09G 3/001 |
| WO | WO-2005060702 | A2 | * | 7/2005 | ....... G06K 19/07703 |
| WO | WO-2005060710 | A2 | * | 7/2005 | ....... G06K 19/07703 |
| WO | WO-2006035205 | A1 | * | 4/2006 | ........ G01M 11/3181 |
| WO | WO-2007008265 | A2 | * | 1/2007 | ......... G01B 9/02057 |
| WO | WO-2008042377 | A2 | * | 4/2008 | ............ G06K 7/0008 |
| WO | WO-2011070309 | A1 | * | 6/2011 | ............ H01J 37/244 |
| WO | WO-2013061184 | A1 | * | 5/2013 | ....... G06K 19/07771 |
| WO | WO-2016053504 | A1 | * | 4/2016 | ............... H04W 4/80 |
| WO | WO-2016094439 | A1 | * | 6/2016 | ............ A61B 5/0077 |
| WO | WO-2017019695 | A1 | * | 2/2017 | ............... G01N 1/14 |
| WO | WO-2017027847 | A1 | * | 2/2017 | ............... H04B 1/40 |
| WO | WO-2017027882 | A1 | * | 2/2017 | ............... G01S 3/04 |
| WO | WO-2018183296 | A1 | * | 10/2018 | ............ G06V 20/80 |
| WO | WO-2019158573 | A1 | * | 8/2019 | ............. H01J 37/04 |
| WO | WO-2020188605 | A1 | * | 9/2020 | ........... G02B 6/4416 |
| WO | WO-2020254240 | A1 | * | 12/2020 | ............... H04B 5/45 |
| WO | WO-2021001138 | A1 | * | 1/2021 | ............... H04B 5/45 |
| WO | WO-2021001169 | A1 | * | 1/2021 | ............ H04W 16/26 |
| WO | WO-2021158492 | A1 | * | 8/2021 | ............. H04L 41/12 |
| WO | WO-2021231627 | A1 | * | 11/2021 | ......... G06K 7/10297 |
| WO | WO-2022025808 | A1 | * | 2/2022 | ............ G01S 13/765 |
| WO | WO-2022035889 | A1 | * | 2/2022 | ............... A61B 3/16 |
| WO | WO-2022046770 | A1 | * | 3/2022 | ............. H02J 50/90 |
| WO | WO-2022098422 | A1 | * | 5/2022 | ......... G06F 21/6218 |
| WO | WO-2022246786 | A1 | * | 12/2022 | ............ H04W 12/63 |
| WO | WO-2022258640 | A1 | * | 12/2022 | ........... H04W 84/047 |
| WO | WO-2023097026 | A2 | * | 6/2023 | ............ G06Q 40/04 |
| WO | WO-2024059413 | A1 | * | 3/2024 | ............... H04B 7/10 |
| WO | WO-2024088218 | A1 | * | 5/2024 | ............... H04B 7/22 |
| WO | WO-2024088582 | A1 | * | 5/2024 | ............ H04L 63/0876 |
| WO | WO-2024088583 | A1 | * | 5/2024 | ............. H02J 50/001 |
| WO | WO-2024097965 | A1 | * | 5/2024 | ............ H04W 48/18 |
| WO | WO-2024113341 | A1 | * | 6/2024 | ........... H04L 5/0005 |
| WO | WO-2024238413 | A1 | * | 11/2024 | ............ H04W 12/06 |

OTHER PUBLICATIONS

International Search Report and Written Opinion for International Application No. PCT/US2024/028994, mailed Sep. 12, 2024, 10 Pages.

* cited by examiner

BACKSCATTER DEVICE ONBOARDING

RELATED APPLICATION

Under provisions of 35 U.S.C. § 119(e), Applicant claims the benefit of U.S. Provisional Application No. 63/502,085, filed May 13, 2023, which is incorporated herein by reference.

TECHNICAL FIELD

The present disclosure relates generally to providing Backscatter Device (BKD) onboarding.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Backscatter Device (BKD) onboarding may be provided. BKD onboarding may begin with an AP receiving an identifier associated with a BKD. The AP may determine to onboard the BKD and transmit to the BKD an onboarding excitation signal to request data from a memory bank of the BKD. The AP may then receive a response to the onboarding excitation signal from the BKD. The AP may verify the BKD is valid based on the identifier and the response. Finally, the AP may onboard the BKD based on verifying the BKD is valid.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Backscatter Devices (BKDs) are devices that may be limited in power and/or processing capabilities. BKDs may have an external battery, have just a limited power supply, and/or may be passive devices. For example, Ambient Power (AMP) BKDs can use Radio Frequency (RF) signals to transmit data without a power source such as a battery or a connection to electricity or use the RF signals to charge the power source. BKDs may be Internet of Things (IoT) devices in some examples.

BKDs may use an antenna to receive a RF signal, use the RF signal for excitation (e.g., convert the RF signal into electricity), and/or modulate or otherwise modify and reflect the RF signal with encoded data. Other devices can receive a reflected RF signal transmitted by a BKD to determine the data the BKD is sending. BKD operations may be described in documents and standards from the Institute of Electrical and Electronics Engineers (IEEE). For example, the IEEE AMP topic interest group and the IEEE 802.11 standard may describe and the operations of BKDs.

Fully passive devices such as RF Identification (RFID) tags usually have different banks of memory. In normal operation, an RFID reader (e.g., a scanner) may be used to excite the RFID tag, and the RFID tag may respond with a pre-configured message that includes the information stored on one or more of the tag's memory banks. Other types of BKD can include sensors, which can store the sensor data on its memory bank and transmit the sensor data when the sensor receives an excitation signal, for example from a scanner.

Mechanisms for BKDs to coexist with typical wireless network devices (e.g., non-BKDs), for example in the sub-1 GHz and the 2.4 GHz bands, need to be developed. For example, onboarding and/or provisioning a device may be required for the device to access the wireless network. Devices may use different association and authorization methods to onboard the device with the wireless network. However, these methods may require multiple message exchanges and (relatively) heavy computing operations on the client side. A BKD may not be able to perform the multiple message exchanges and/or computing operations. Therefore, methods are described herein to onboard a BKD, whether the BKD is a passive device or an otherwise constrained device (e.g., devices for which energy consumption needs to remain minimal).

Figure 1:
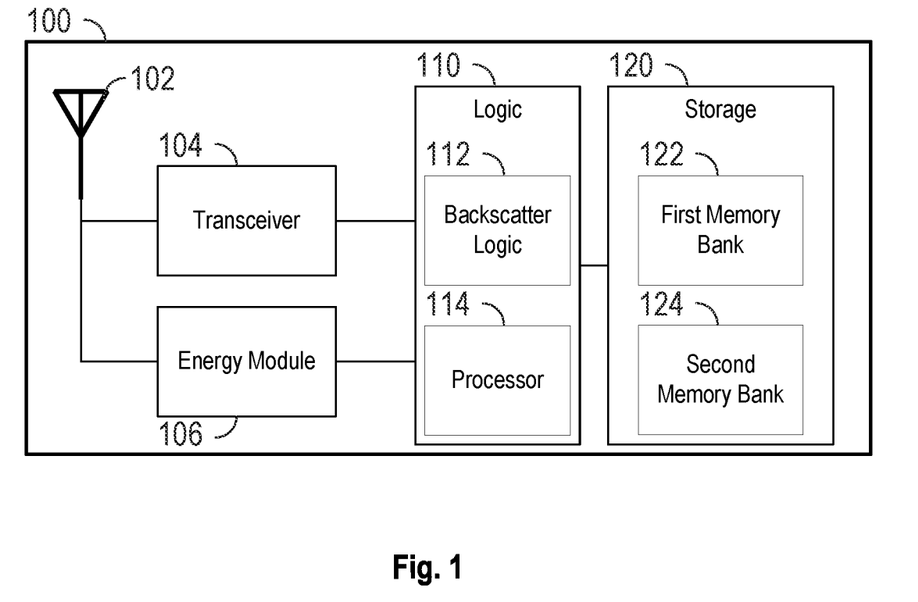
FIG. 1 is a block diagram of a Backscatter Device (BKD) for BKD onboarding.

FIG. 1 is a block diagram of a BKD 100 for BKD onboarding. The BKD 100 may have an external battery, have just a limited power supply, and/or may be passive. The onboarding method described herein may enable the BKD 100 to complete onboarding with a wireless network whether it has a power supply or is passive. Onboarding may include registering the BKD 100 onto the network and/or activating the BKD 100 (e.g., unlocking the BKD 100, causing or otherwise enabling the BKD 100 to respond to additional signals such as signals requesting data from the BKD 100).

The BKD 100 may include an antenna 102, a transceiver 104, an energy module 106, logic 110, and storage 120. The logic 110 may include backscatter logic 112 and a processor 114. The storage 120 may include a first memory bank 122 and a second memory bank 124. The antenna 102 and the transceiver 104 may operate to transmit and/or receive signals, including receiving excitation signals and transmitting signals in response to excitation signals for example. The energy module 106 may convert a signal the BKD 100 receives into electric energy the BKD 100 can use. For example, the energy module 106 may provide electric energy to the transceiver 104, the logic 110 (e.g., the backscatter logic 112 and/or the processor 114), and/or the storage 120 to enable the components to operate.

The logic 110 may include one or more modules (e.g., the backscatter logic 112) and/or one or more processing units (e.g., the processor 114). The backscatter logic 112 may include components for the BKD 100 to perform backscattering or otherwise transmit signals. For example, the BKD 100 may use the backscatter logic 112 to modulate or otherwise modify a signal (e.g., a signal the BKD 100 receives) to encode data onto the signal, thereby generating a new signal that includes encoded data. The BKD 100 can transmit the new signal with the encoded data to other devices by backscattering or otherwise reflecting the new signal. In some examples, the backscatter logic 112 may be a transponder or one of its components may be a transponder. The processor 114 may control the operation of the BKD 100, including the operation of the transceiver 104, the energy module 106, the backscatter logic 112, and/or the storage 120. The processor 114 may be one or more conventional processors, multi-core processors, microprocessors, microcontrollers, and/or the like.

The storage 120 may include any number of memory banks (e.g., the first memory bank 122 and the second memory bank 124). The storage 120 may store data in the first memory bank 122, the second memory bank 124, and/or the like. For example, the storage 120 may store data and/or receive requests from the backscatter logic 112 so the backscatter can determine how to modulate a signal and determine and/or retrieve data to encode on a signal. The storage 120 may also store data and/or receive requests from the processor 114 so the processor 114 can determine how to instruct the BKD 100 to operate (e.g., to instruct the backscatter logic 112 how to modulate a signal and/or what data to encode on a signal, instruct the transceiver 104 to transmit and/or receive signals, etc.).

The BKD 100 may be designed so that, even if the BKD 100 is a passive device, the BKD 100 can respond in a different manner to different types of exciting signals. The first memory bank 122 may store data that should be encoded onto a backscattered signal in response to the BKD 100 receiving a first type of excitation signal, the second memory bank 124 may store data that should be encoded onto a backscattered signal in response to the BKD 100 receiving a second type of excitation signal, and additional memory banks of the storage 120 may store additional data for transmission in response to the BKD 100 receiving additional types of excitation signals. Thus, when the BKD 100 receives the first type of excitation signal, the BKD 100 may encode the data stored in the first memory bank 122 in a signal and backscatter the signal with the encoded data. For example, the transceiver 104 may receive the first type of excitation signal, the processor 114 may determine to and the instruct the backscatter logic 112 to encode the data in the first memory bank 122 to the signal in response to the transceiver 104 receiving the first type of excitation signal, the backscatter logic 112 may encode the data from the first memory bank 122, and the transceiver 104 may transmit the signal with the encoded data. For example, the first memory bank 122 may encode data associated with onboarding.

Similarly, when the BKD 100 receives the second type of excitation signal, the BKD 100 may encode the data stored in the second memory bank 124 onto the signal and backscatter or otherwise transmit the signal with the encoded data. For example, the second memory bank 124 may store data associated with standard data the BKD 100 may send during standard operation (e.g., device ID, location data, sensor data, etc.). The different types of excitation signals may therefore be used to onboard the device (e.g., using the first type of excitation signal to receive the onboarding data stored by the first memory bank 122) and to read the standard information from the device (e.g., using the second type of excitation signal to receive the data the BKD 100 may send during operation). The BKD 100 may transmit signals with encoded data back to the device that transmitted the excitation signal and/or another device.

To enable onboarding, the BKD 100 may be assigned (e.g., during manufacturing) an identifier or otherwise unique code. The identifier may be provided to the owner of the BKD 100, for example via an out-of-band means (e.g. sticker, QR code, online access code, etc.). The BKD 100 may send the identifier and/or information derived from the identifier (e.g., a hash generated from the identifier that the BKD 100 generates and/or stores) when the BKD 100 receives a signal for onboarding (e.g., the first type of excitation signal) or onboarding is otherwise initiated. Network devices can then use the identifier and/or information derived from the identifier to recognize the BKD 100 as valid and onboard the BKD 100.

Figure 2:
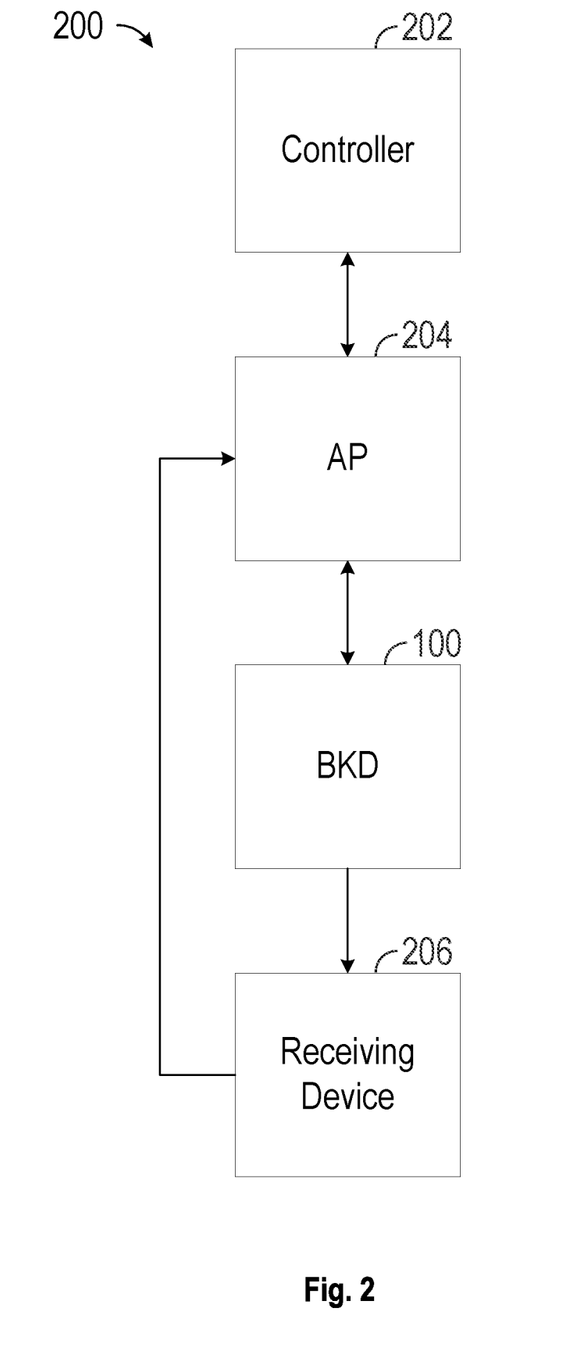
FIG. 2 is a block diagram of an operating environment for BKD onboarding.

FIG. 2 is a block diagram of an operating environment 200 for BKD onboarding. The operating environment 200 may include the BKD 100, a controller 202 an Access Point (AP) 204, and a receiving device 206. The operating environment 200 may include a different amount of BKDs in other examples. The controller 202 may be any network controller such as a Wireless Local Area Network (WLAN) Controller that controls the devices of the wireless network, such as the AP 204. The AP 204 may enable devices to access the wireless network.

When the network determines to discover and/or onboard new devices (e.g., determining to onboard the BKD 100 to enable the reception of the standard data the BKD 100 can transmit), the AP 204 may emit a specific onboarding signal. For example, the controller 202 may determine to discover and/or onboard the BKD 100 to enable the reception of data from the BKD 100, and the controller 202 may instruct the AP 204 to onboard the BKD 100. In another example, the AP 204 may determine to discover and/or onboard the BKD 100 without instruction from the controller 202. To initiate discovery and/or onboarding, the AP 204 may transmit the onboarding signal on demand (e.g., in response to instructions from the controller 202), periodically, in response to a change in the network, and/or the like.

The onboarding signal may be the first type of excitation signal described above for example. The onboarding signal may have different RF characteristics (e.g. segment of a channel used, signal width and intensity etc.) and/or a different structure (e.g. modulation or encoding that triggers the activation of one or other memory bank on the device) than a standard excitation signal, such as the second type of excitation signal described above, that may sent to request standard information from the BKD 100. The BKD 100 may only respond to the onboarding signal if the signal matches the signal format code the BKD 100 expects.

Upon reception of the onboarding excitation signal, the BKD 100 may transmit a response, such as a backscattered signal with the onboarding data stored by the first memory bank 122 encoded on the onboarding excitation signal, containing the identifier or some information derived from the identifier (e.g., a hash derived from the identifier). The AP 204 and/or the receiving device 206 may receive the response. When the receiving device 206 receives the response, the receiving device 206 may transmit the response to the AP 204 and/or perform the onboarding of the BKD 100 itself. The BKD 100 may send the response in a way and/or format that the AP 204 and/or the receiving device 206 can compare the identifier of the response with the identifier originally obtained, such as by out-of-band means, to verify the BKD 100 is valid. When the AP 204 and/or the receiving device 206 determines the BKD 100 is valid by comparing the response to the identifier originally received, the AP 204 and/or the receiving device 206 may onboard the BKD 100. Onboarding may include registering the BKD 100 and/or activating the BKD 100. The onboarding process can be repeated, either for the same or for different excitation signals. For example, the second memory bank 124 may contain device identity information, a third memory bank may include sensor information, etc., and an onboarding process may be performed to access each memory bank.

Once the BKD 100 has been onboarded as described above, the BKD 100, the AP 204, and/or the receiving device 206 can perform standard or regular communications. For example, the AP 204 can transmit other types of exciting signals (e.g., a standard excitation signal, an excitation signal to receive the data from the second memory bank 124, etc.) to energize the BKD 100 via the energy module 106 and/or obtain standard information from the other memory bank(s). With the capability to send a certain type of excitation signal to access different memory banks, the AP 204 and/or the receiving device 206 can access, unlock, discover, etc. different types of information from the BKD 100.

The BKD 100 may require the reception of a particular excitation signal (e.g., type of excitation signal) from a device (e.g., the AP 204) to unlock or otherwise encode the data from a particular memory bank of the storage 120. The BKD 100 may indicate the type of excitation signal required for via backscattered signals to the AP 204 and/or the receiving device 206 so the AP 204 can subsequently send the indicated type of excitation signal to access the desired memory bank. For example, the BKD 100 may indicate one or more excitation signal types to access one or more memory banks in a transmission the BKD 100 is responding to for a different memory bank (e.g., including the excitation signal types in a backscattered signal that includes data encoded from a specified memory bank based on the type of excitation signal the BKD 100 previously received). In some examples, the backscattered signal may include a hash that indicates the structure needed for a subsequent message to unlock a response from an indicated memory bank.

Figure 3:
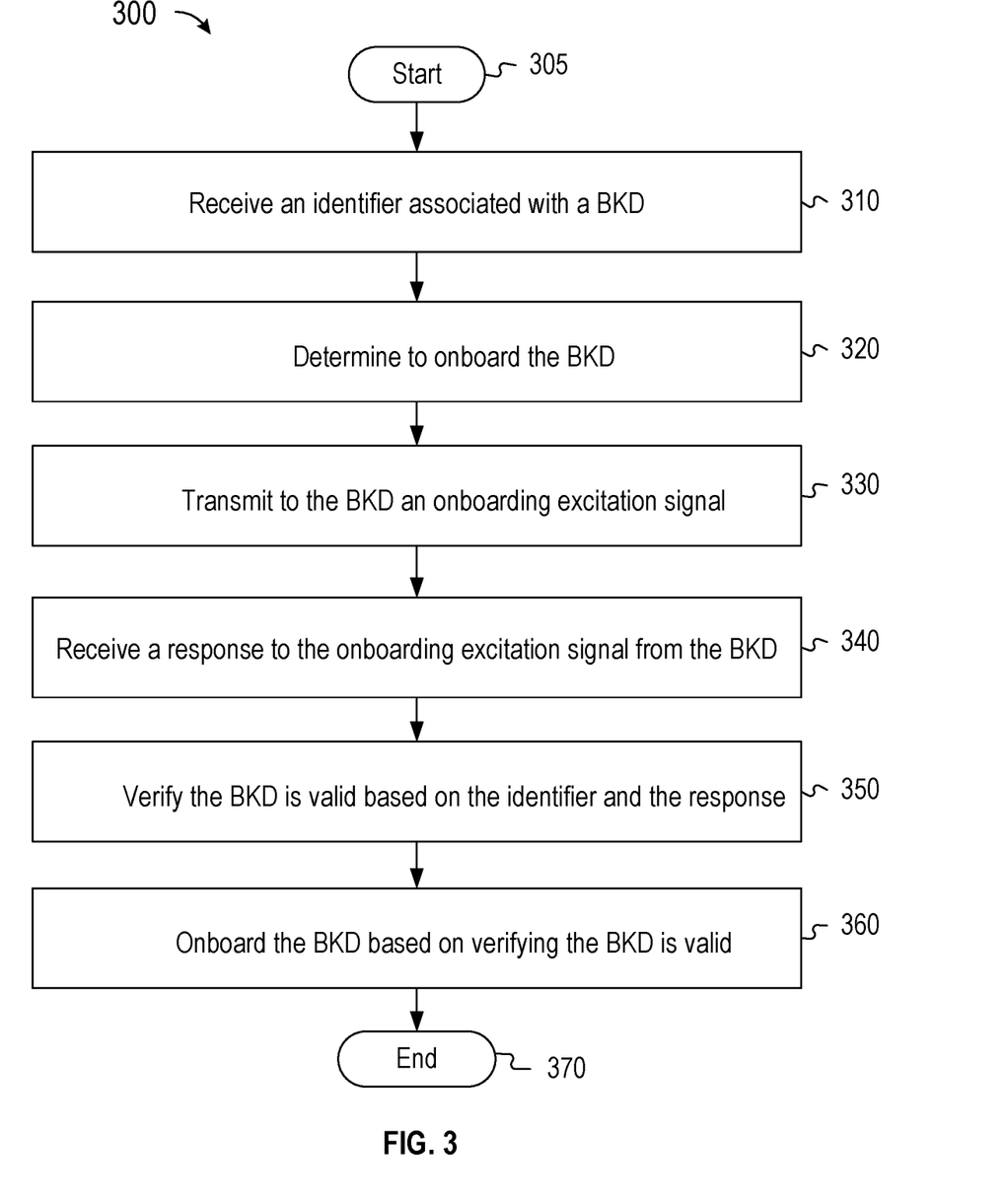
FIG. 3 is a flow chart of a method for BKD onboarding.

FIG. 3 is a flow chart of a method 300 for BKD onboarding. The method 300 may begin at starting block 305 and proceed to operation 310. In operation 310, an identifier associated with a BKD is received. For example, the AP 204 may receive an identifier associated with the BKD 100. The AP 204 may receive the identifier via an out-of-band means (e.g. sticker, Quick Response (QR) code, online access code, etc.), from the controller 202, via the Internet, and/or the like.

In operation 320, it may be determined to onboard a BKD. For example, the AP 204 determines to onboard the BKD 100. The AP 204 may determine to onboard the BKD 100 in response to instructions from the controller 202, in response to detecting a change in the network (e.g., the presence of a new device in range of the network), in response to receiving the identifier associated with the BKD 100 in operation 310, and/or the like. The AP 204 may also be provisioned to periodically attempt to onboard devices such as the BKD 100 and/or the like. Thus, the AP 204 may not actively determine to onboard the BKD 100 in every example.

In operation 330, an onboarding excitation signal may be transmitted to the BKD to request data from a memory bank of the BKD. For example, the AP 204 transmits an onboarding excitation signal to request the onboarding data from the first memory bank 122. The onboarding excitation signal may have different RF characteristics and/or a different structure compared to standard excitation signals and types of excitation signals the AP 204 may transmit to access data in other memory banks like the second memory bank 124.

In operation 340, a response to the onboarding excitation signal may be received from the BKD. For example, the AP 204 may receive from the BKD 100 the response to the onboarding excitation signal the AP 204 transmits to the BKD 100 in operation 330. The response may include the identifier associated with the BKD 100 and/or information derived from the identifier such as a hash generated using the identifier.

In operation 350, the BKD may be verified to be valid based on the identifier and the response. For example, the AP 204 may verify the BKD 100 is valid by comparing the identifier received in operation 310 and the response received in operation 340. When the response includes a hash generated using the identifier, the AP 204 may decode the hash before comparing the identifier and the response.

In operation 360, the BKD may be onboarded based on verifying the BKD is valid. For example, the AP 204 may onboard the BKD 100 after determining the BKD 100 is valid in operation 350. The AP 204 and other devices of the network may then transmit to the BKD 100 additional excitation signals of different types to receive standard information, such as information stored in the second memory bank 124 and/or additional memory banks. The method 300 may conclude at ending block 370.

Figure 4:
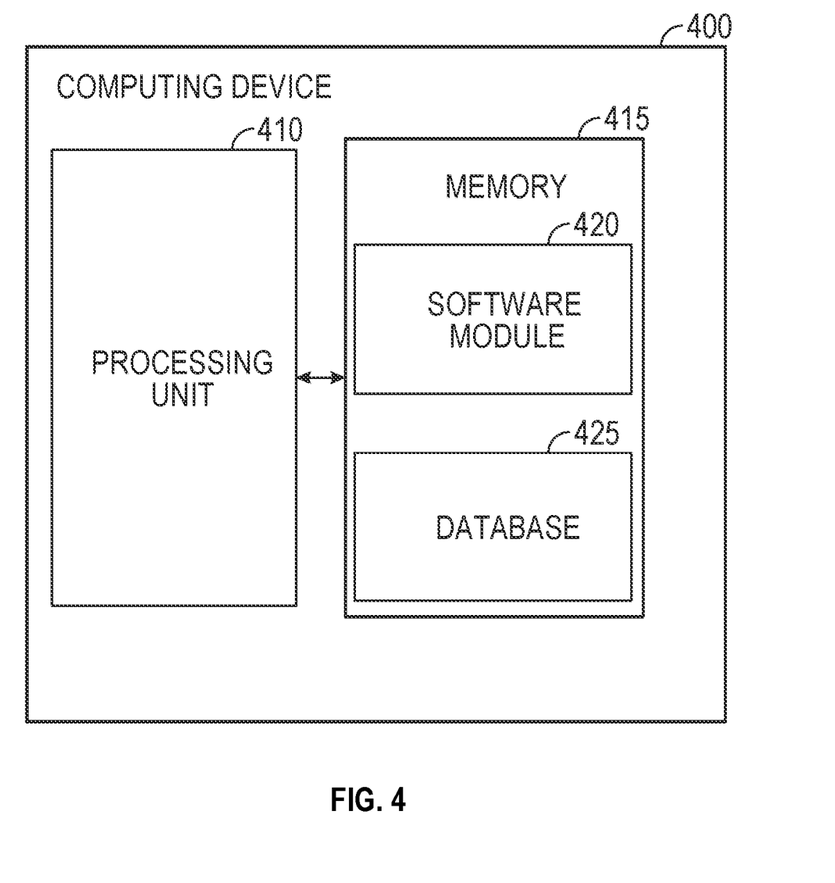
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for BKD onboarding with respect to FIG. 1, FIG. 2, and FIG. 3. Computing device 400, for example, may provide an operating environment for the BKD 100, the controller 202, the AP 204, the receiving device 206, and the like. The BKD 100, the controller 202, the AP 204, the receiving device 206, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   receiving an identifier associated with a Backscatter Device (BKD);
   determining to onboard the BKD;
   transmitting to the BKD an onboarding excitation signal to request data from a memory bank of the BKD;
   receiving a response to the onboarding excitation signal from the BKD;
   verifying the BKD is valid based on the identifier and the response;
   onboarding the BKD based on verifying the BKD is valid;
   receiving an indicated type of excitation signal to access a second memory bank of the BKD;
   transmitting a second excitation signal of the indicated type to the BKD; and
   receiving data from the second memory bank of the BKD in response to transmitting the second excitation signal.

2. The method of claim 1, wherein the response comprises any one of (i) the identifier, (ii) a hash generated using the identifier, or (iii) a combination of (i) and (ii).

3. The method of claim 1, further comprising:
transmitting a second type of excitation signal to request standard data from a second memory bank of the BKD.

4. The method of claim 3, wherein the standard data comprises any one of (i) a device identifier, (ii) location data, (iii) sensor data, or (iv) any combination of (i)-(iii).

5. The method of claim 3, wherein the onboarding excitation signal has (i) different Radio Frequency (RF) characteristics, (ii) a different structure, or (iii) a combination of (i) and (ii) from the second type of excitation signal.

6. The method of claim 1, wherein the data from the second memory bank comprises a second indicated type of excitation signal to access a third memory bank of the BKD.

7. A system comprising:
a memory storage; and
a processing unit coupled to the memory storage, wherein the processing unit is operative to:
receive an identifier associated with a Backscatter Device (BKD);
determine to onboard the BKD;
transmit to the BKD an onboarding excitation signal to request data from a memory bank of the BKD;
receive a response to the onboarding excitation signal from the BKD;
verify the BKD is valid based on the identifier and the response;
onboard the BKD based on verifying the BKD is valid;
receive an indicated type of excitation signal to access a second memory bank of the BKD;
transmit a second excitation signal of the indicated type to the BKD; and
receive data from the second memory bank of the BKD in response to transmitting the second excitation signal.

8. The system of claim 7, wherein the response comprises any one of (i) the identifier, (ii) a hash generated using the identifier, or (iii) a combination of (i) and (ii).

9. The system of claim 7, the processing unit being further operative to:
transmit a second type of excitation signal to request standard data from a second memory bank of the BKD.

10. The system of claim 9, wherein the standard data comprises any one of (i) a device identifier, (ii) location data, (iii) sensor data, or (iv) any combination of (i)-(iii).

11. The system of claim 9, wherein the onboarding excitation signal has (i) different Radio Frequency (RF) characteristics, (ii) a different structure, or (iii) a combination of (i) and (ii) from the second type of excitation signal.

12. The system of claim 7, wherein the data from the second memory bank comprises a second indicated type of excitation signal to access a third memory bank of the BKD.

13. A non-transitory computer-readable medium that stores a set of instructions which when executed perform a method executed by the set of instructions comprising:
receiving an identifier associated with a Backscatter Device (BKD);
determining to onboard the BKD;
transmitting to the BKD an onboarding excitation signal to request data from a memory bank of the BKD;
receiving a response to the onboarding excitation signal from the BKD;
verifying the BKD is valid based on the identifier and the response;
onboarding the BKD based on verifying the BKD is valid;
receiving an indicated type of excitation signal to access a second memory bank of the BKD;
transmitting a second excitation signal of the indicated type to the BKD; and
receiving data from the second memory bank of the BKD in response to transmitting the second excitation signal.

14. The non-transitory computer-readable medium of claim 13, wherein the response comprises any one of (i) the identifier, (ii) a hash generated using the identifier, or (iii) a combination of (i) and (ii).

15. The non-transitory computer-readable medium of claim 13, the method executed by the set of instructions further comprising:
transmitting a second type of excitation signal to request standard data from a second memory bank of the BKD.

16. The non-transitory computer-readable medium of claim 15, wherein the standard data comprises any one of (i) a device identifier, (ii) location data, (iii) sensor data, or (iv) any combination of (i)-(iii).

17. The non-transitory computer-readable medium of claim 15, wherein the onboarding excitation signal has (i) different Radio Frequency (RF) characteristics, (ii) a different structure, or (iii) a combination of (i) and (ii) from the second type of excitation signal.

* * * * *